United States Patent [19]

Engle, III

[11] 3,926,907

[45] Dec. 16, 1975

[54] STABILIZED THERMOSET RESINS FROM POLY(ARYLACETYLENES)

[75] Inventor: Edward Jacob Engle, III, Hockessin, Del.

[73] Assignee: Hercules Incorporated, Wilmington, Del.

[22] Filed: Jan. 22, 1973

[21] Appl. No.: 325,777

[52] U.S. Cl. ... 260/45.7 P; 260/30.4 R; 260/32.8 R; 260/33.2 R; 260/33.6 UA; 260/33.8 UA; 260/42.29; 260/42.37; 260/88.2 C; 260/88.2 D; 260/93.5 R; 260/94.1
[51] Int. Cl. ..................... C08f 45/58; C08f 45/28
[58] Field of Search ........... 260/37 R, 88.2 D, 94.1, 260/88.2 C, 93.5 R, 33.6 UA, 45.7 P

[56] References Cited
UNITED STATES PATENTS

| | | | |
|---|---|---|---|
| 3,066,119 | 11/1962 | Meriwether | 260/94.1 |
| 3,300,456 | 1/1967 | Hay | 260/94.1 |
| 3,562,236 | 2/1971 | D'Alelio | 260/33.6 UA |
| 3,705,131 | 12/1972 | Korshak | 260/93.5 R |
| 3,705,131 | 12/1972 | Korshak et al. | 260/93.5 R |
| 3,709,863 | 1/1973 | White et al. | 260/33.6 UA |

OTHER PUBLICATIONS

Chemical Abstracts, 63:751e.
Chemical Abstracts, 62:10616e.
Chemical Abstracts, 59:6586b.

*Primary Examiner*—Donald E. Czaja
*Assistant Examiner*—H. H. Fletcher
*Attorney, Agent, or Firm*—John W. Whitson

[57] ABSTRACT

The invention relates to thermoset resins having exceptional oxidative thermal stability. The resins are prepared from thermosetting compositions containing new poly(arylacetylenes) and certain thermal stabilizers therefor. Representative stabilizers are boric acid, benzenesulfonic acid and butyl acid phosphate.

13 Claims, No Drawings

STABILIZED THERMOSET RESINS FROM POLY(ARYLACETYLENES)

This invention relates to thermosetting compositions and thermoset resins therefrom, and more particularly to such compositions and resins derived from acetylenically substituted aromatic compounds. The thermoset resins have exceptional thermal stability, and the invention also relates to the preparation of these resins.

High temperature resins presently available have various drawbacks which limit their use in many applications. A serious one frequently encountered is the evolution of volatiles during the curing cycle, which makes it imperative that the entire curing cycle be carried out under pressure. For example, polyimides when cured release volatile components which cause gas bubble or void formation in the cured resin unless considerable pressure is maintained during the curing operation in order to prevent these undesirable results. When phenolic resins are cured, water is released which also causes void formation unless the curing reaction is carried out under pressure. Another disadvantage of the previously known high temperature resistant resins is their inability to be molded into desired shapes by conventional methods due to their poor flow characteristics.

The foregoing disadvantages have been obviated by the discovery of a new class of arylacetylene polymers and thermosetting compositions containing them. The polymers and certain of the thermosetting compositions are described and claimed in the copending application of Harold Jabloner Ser. No. 262,166, filed June 12, 1972. Other thermosetting compositions containing these polymers are described and claimed in the copending application of Lawrence C. Cessna, Jr., Ser. No. 316,332, filed Dec. 18, 1972. These thermosetting compositions have excellent melt flow properties and can be molded or otherwise shaped without gas evolution, hence, after forming into the desired shape, they can be cured simply by heating, and this operation need not be carried out under pressure, since there also is no gas evolution during the curing step. In addition to being readily molded, these thermosetting compositions also are useful in other shaping or related operations, such as coating, casting, potting and impregnating operations. Furthermore, these thermosetting compositions on being cured provide thermoset resins having excellent thermal stability. However, it was recognized that for certain end use applications it would be desirable for the resins to have even greater oxidative thermal stability and retention of physical properties after prolonged exposure to high temperatures.

Now, in accordance with this invention, thermosetting compositions have been discovered which make it possible to impart to the above resins a markedly improved oxidative thermal stability. The thermosetting compositions of this invention comprise a blend of (1) a prepolymer of at least one polyacetylenically substituted aromatic compound, said prepolymer having a number average molecular weight of from about 900 to about 12,000 with (2) from about 0.1 to about 20%, by weight of the prepolymer, of at least one thermal stabilizer selected from the group consisting of (a) inorganic oxyacids of boron, phosphorus and sulfur, (b) alkyl esters of said oxyacids wherein the alkyl group contains 1 to 12 carbon atoms, (c) aryl esters of said oxyacids wherein the aryl group contains 6 to 10 carbon atoms, (d) arene boronic, phosphinic, phosphonic, sulfinic and sulfonic acids wherein the aryl group contains 6 to 10 carbon atoms, (e) ammonium and amine salts of said oxyacids, of said alkyl and aryl esters which are partial esters, and of said arene boronic, phosphinic, phosphonic, sulfinic and sulfonic acids, (f) salts and acid salts of said oxyacids of phosphorus and Group II A metals, and (g) aryl phosphines and phosphine oxides wherein the aryl group contains 6 to 10 carbon atoms. The amount of stabilizer preferably is from about 0.5 to about 10%, most preferably from about 1 to about 5%, by weight based on the prepolymer.

The thermoset resins obtained by curing the thermosetting compositions of this invention are characterized by being essentially free of aliphatic unsaturation and predominantly aromatic in structure. These thermoset resins are further characterized by having a flexural strength of at least about 4000 p.s.i. and a flexural modulus of at least about 350,000 p.s.i. These resins also are characterized by retaining at least about 35% of said flexural modulus up to a temperature of at least about 300°C. in an inert atmosphere, retaining at least about 50% of said flexural strength and modulus and at least about 90% of their weight when a 30 mil thick sheet is aged in air at 260°C. for 350 hours and losing less than about 20% of their weight when heated, in powder form, to 500°C. at a rate of 10°C. per minute in an inert atmosphere.

The thermoset resins of this invention are prepared by a two stage process. There is prepared, in the first stage, a polyacetylenically unsaturated prepolymer from a polyacetylenically substituted aromatic compound. In the second stage, the prepolymer in combination with at least one of the specified thermal stabilizers, and preferably also in combination with at least one fluidizer for the prepolymer, is fabricated and heated whereby resinification takes place. By this means it is possible to produce the thermoset resin in any desired shape since the blend of the prepolymer and the fluidizer compound is readily formed into any desired shape and this molded, or otherwise formed, article can then be cured by heating and will retain its shape.

PREPARATION OF THE PREPOLYMER

As already stated, the first stage in the preparation of the thermoset resins of this invention is the formation of a prepolymer from at least one polyacetylenically substituted aromatic compound, which prepolymer is subsequently blended in a second stage with the thermal stabilizer, and preferably also a fluidizer for the prepolymer, and the resulting thermosetting composition then is fabricated and thermally cured.

The polyacetylenically substituted aromatic compound used to prepare these prepolymers can be any aromatic compound containing two or more acetylene groups, i.e., two carbons linked by a triple bond, attached to the same aromatic ring or to different aromatic rings in the compound, or mixtures of such compounds. The acetylenic groups can be internal, i.e., acetylene groups of the type aryl-C ≡ C-aryl, or they can be external, i.e., ethynyl groups of the type aryl-C ≡ C-H, or both types can be present in the polyacetylenic compound. Those compounds containing at least one external acetylenic group are preferred since these are the most reactive. Generally those compounds containing only internal acetylenic groups are used in admixture with a compound containing at least one ethynyl group. Exemplary of the polyacetylenically substituted aromatic compounds are m- and p-diethynylbenzenes; diethynyl toluenes; diethynyl xylenes; 9,10-diethynylanthracene; diethynylbiphenyl; 9,10-diethynylphenanthrene; 4,4'-diethynyl-trans-azobenzene; di(ethynylphenyl)ether; 2,3,5,6-tetrachloro-1,4-diethynylbenzene; diphenyl-diacetylene (i.e., diphenylbutadiyne); dibenzyl-diacetylene; di-p-tolyldiacetylene; di-α-naphthyldiacetylene; 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris-(phenylethynyl)-2,4,6-triphenylbenzene; 1,2,4-tris(phenylethynyl)-3,5,6-triphenylbenzene; tris(ethynylphenyl)benzene, etc. Monoacetylenically substituted aromatic compounds can also be utilized in the preparation of the prepolymer as, for example, phenylacetylene, biphenylacetylene and diphenylacetylene.

As mentioned earlier, mixtures of the polyacetylenically substituted aromatic compounds may be used to prepare the prepolymers. A particularly advantageous mixture is that of diethynylbenzene with diphenylbutadiyne, with the latter component constituting from about 30 to about 75% by weight of the total mixture. The diethynylbenzene component may be m-diethynylbenzene, p-diethynylbenzene or mixtures thereof. The resulting copolymers contain about 30% to about 75% by weight of diphenylbutadiyne-derived units since the diphenylbutadiyne component enters the copolymer at substantially the same rate as the diethynylbenzene component. These copolymers may be cured, after blending with at least one of the thermal stabilizers of this invention, and preferably also with a fluidizer for the prepolymer, to provide thermoset resins having the prescribed strength and high temperature oxidation resistance properties. In addition, the resins derived from these copolymers have significantly higher elongation at break values, about 1.1 to about 1.8%, in comparison to the corresponding resins derived from diethynylbenzene homopolymers, wherein the elongation at break values are less than 1.0%.

Another advantageous mixture is that of diethynylbenzene with phenylacetylene. Again, the diethynylbenzene component may be m-diethynylbenzene, p-diethynylbenzene or mixtures thereof. The phenylacetylene component in this case enters the copolymer at approximately one-half the rate of the diethynylbenzene component. Thus, considerable variation in the composition of the reaction mixture is possible in producing copolymers containing from about 10 to about 45% by weight of phenylacetylene-derived units. The resulting copolymers when combined with at least one of the thermal stabilizers of this invention, and preferably also with a fluidizer for the prepolymer, can be cured to provide thermoset resins having the prescribed high temperature oxidation resistance properties. Additionally, these resins are significantly higher in flexural strength and flexural modulus in comparison to the corresponding resins prepared from the diethynylbenzene homopolymers.

The prepolymerization reaction is carried out by heating the polyacetylenically substituted aromatic compound with an aromatization catalyst. The reaction can be carried out in bulk or in the presence of an inert diluent. Any inert diluent can be used, as, for example, ethers such as 1,2-dimethoxyethane, dioxane and tetrahydrofuran, ketones such as acetone, or aromatic hydrocarbons such as benzene, toluene, xylene, etc. The amount of diluent used is not critical and generally will be such as to form a concentration of the polyacetylenically substituted aromatic compound in the diluent of from 2 to 50%. Obviously, larger amounts can be used.

Any aromatization catalyst can be used to effect the desired cyclization reaction. By the term aromatization catalyst is meant a catalyst that promotes the formation of an aromatic ring by the cyclization of three acetylene groups. Preferred aromatization catalyst are nickel catalysts such as nickel bis(acrylonitrile), nickel bis(a-craldehyde), nickel carbonyl bis(triphenylphosphine), nickel cyanide bis(triphenylphosphine), nickel acetylacetonate in combination with triphenylphosphine, and the Group V-B metal halides such as niobium pentahalides and tantalum pentahalides. The amount of the catalyst used can be varied widely but generally will be from about 0.5 to about 5% of the monomer by weight.

The polymerization is carried out by heating the polyacetylenic monomer, or mixtures of monomers, with the catalyst to a temperature of from about 55° to about 250°C. and more preferably from about 80° to about 150°C. Preferably the reaction is carried out in an inert atmosphere.

In carrying out the process it is essential to stop the reaction prior to complete conversion of the monomer. If the reaction is allowed to go to completion, the product is a highly cross-linked, insoluble, infusible material that cannot be plastic formed, nor can it be fluidized with a fluidizer and then plastic formed. Hence the reaction is generally stopped at a monomer conversion above about 30% and below about 90%, and preferably at a monomer conversion of from about 50% to about 90%. By so doing, it is possible to produce a prepolymer having a number average molecular weight of from about 900 to about 12,000, avoid the production of the very high molecular weight polymer that is cross-linked and no longer useful for the production of plastic formed articles and at the same time retain in the prepolymer at least about 5%, and preferably about 5 to 20%, acetylene groups by weight of the prepolymer for reaction in the second stage of the thermoset resin preparation. The prepolymers are soluble in aromatic hydrocarbons, ketones and ethers.

The method by which the prepolymerization reaction is stopped and the prepolymer is isolated will, of course, depend in large measure on the method used in preparing the prepolymer, the monomer or monomers used in its preparation, etc. If a polyacetylenically substituted aromatic monomer of high volatility were used in the preparation of the polymer, i.e., one having a boiling point below about 250°C., then any of such a monomer remaining in the prepolymer should be removed to avoid foaming and void formation in the plastic forming and curing steps used in the preparation of the thermoset resin in the second stage reaction. This removal can be effected by vacuum evaporation or steam distillation of the prepolymerization reaction mixture or the reaction mixture can be mixed with a diluent which is a solvent for the monomer and a non-solvent for the prepolymer. In the latter case, the prepolymer can be separated, as for example, by filtration, and the monomer, any prepolymer remaining in solution, and the diluents can be recovered and recycled in the process. Suitable diluents for precipitating the prepolymer are methanol, ethanol and isopropanol, and aliphatic hydrocarbons or mixtures thereof such as petroleum ether, pentane, hexane, heptane, etc.

The prepolymers of this invention are unique polymers, and are described and claimed in the aforementioned copending application of Harold Jabloner. In contrast to the acetylene polymers of the prior art, the instant polymers can be used to prepare thermoset resins having the desirable properties described herein. It is well known that acetylene and substituted acetylenes, as for example, phenylacetylene, can be polymerized, but the polymers so produced are linear polymers, many of which have olefinic or acetylenic unsaturation in the polymer chain. It is also known that aliphatic compounds containing two or more acetylenic groups can be polymerized, but again the polymer is linear and contains acetylenic unsaturation in the polymer chain. However, the instant prepolymers, prepared from a polyacetylene compound with an aromatization catalyst, differ from the prior art acetylene polymers in that they are predominately non-linear in structure, at least 50% of the acetylenic unsaturation of the monomer having been converted during polymerization into aromatic structures. Furthermore, the unsaturation remaining in the prepolymer is chiefly acetylenic, which permits further polymerization in the second stage reaction, and the prepolymer has only a low degree of olefinic unsaturation. The acetylenic content of the prepolymer will preferably be from about 5% to about 20% by weight of the prepolymer. The low degree of olefinic unsaturation is important since the presence of a significant amount of such unsaturation leads to thermal and oxidative instability of the final thermoset resin at high temperature. The formation of aromatic structures during the polymerization contributes oxidation resistant and stable linkages.

The olefinic unsaturation of the prepolymer can be determined by a nuclear magnetic resonance method in which the number of hydrogen atoms attached to olefinic carbons, such hydrogens hereafter being referred to as olefinic protons, is compared with the number of hydrogen atoms attached to aromatic rings, such hydrogens hereafter being referred to as aromatic protons. The amount of acetylenic unsaturation can be determined by a similar technique comparing the ratio of hydrogens attached to acetylenic carbons, such hydrogens hereafter being referred to as acetylenic protons, with the aromatic protons. The prepolymer, to be useful in the preparation of the final thermoset resin, will, as stated above, have a ratio of aromatic protons to olefinic protons greater than about 2.4:1 and preferably greater than about 7.5:1.

The ratio of acetylenic, aromatic and olefinic protons present in the prepolymer is determined by a nuclear magnetic resonance method using deuterated acetone as a solvent. The areas under the peaks near 3.63 ppm., the peak at 7.48 ppm., and under the curve between 6.83 and 5.4 ppm. are proportional to the number of acetylenic, aromatic and olefinic protons, chemical shift values being measured versus an internal tetramethylsilane reference.

The amount of acetylenic protons, and so the acetylene group concentration, is determined quantitatively by use of an internal standard, nitromethane added in accurate proportion to the prepolymer and giving a signal peak at 4.42 ppm.

PREPARATION OF THE THERMOSETTING COMPOSITION

The above-described prepolymers are high melting materials and, in so far as most thermoforming techniques are concerned, the prepolymers do not have the flow properties required for plastic forming at temperatures below the aromatization polymerization reaction temperature. In other words, if they are heated to flow temperature the polymerization reaction proceeds so that an infusible, insoluble and intractable product is formed. However, in the practice of this invention, the addition of a fluidizer to the prepolymer makes it possible to produce a composition that will have sufficient flow to permit plastic forming and that, when further heated after plastic forming, will cross-link through the acetylenic unsaturation in the prepolymer to produce a thermoset resin.

One type of fluidizer that can be used to modify the flow properties of the prepolymer, yet not detract from the desired high temperature stability and oxidation resistance properties of the thermoset resin products, is that represented by certain aromatic organic compounds having specified structure and physical characteristics. These aromatic compounds are described in the aforementioned copending application of Lawrence C. Cessna, Jr. These compounds or mixtures thereof should contain no more than 5% of material volatile at 240°C. when distilled according to the procedure of ASTM D20-56, to avoid undue loss by vaporization during fabrication and thermal curing. Also, these compounds or mixtures of compounds should contain no crystalline organic phase at 220°C. to insure compatability with, and consequent fluidization of, the prepolymer. The temperature at which the compounds or mixtures thereof contain no crystalline organic phase is of further significance in that this temperature should not be so high as to cause an excessive amount of curing of the prepolymer during the time required to effect fabrication of the thermosetting composition containing it. These fluidizer compounds also should have a viscosity of less than 20 centipoises at 220°C. and should be thermally stable and resistant to oxidation at high temperatures. Compounds having these properties are further characterized by containing at least two six-membered aromatic rings, which rings may be substituted by a methyl group, the rings being condensed with each other or coupled with each other directly or through a single oxygen, sulfur, nitrogen or phosphorus atom or through a methylene, dimethylmethylene, ethylene, vinylene or keto group.

More specifically, these fluidizer compounds are aromatic compounds containing two or more benzene or pyridine rings condensed with each other or coupled to each other directly or through specified atoms or groups acting to link the rings to each other. Exemplary of the condensed ring aromatics are anthracene, 1-methylanthracene, 2-methylanthracene, 1-methylnaphthalene, 2-methylnaphthalene, 1,4-dimethylnaphthalene, 2,3-dimethylnaphthalene, 2,6-dimethylnaphthalene, phenanthrene, 1-methylphenanthrene, 3-methylphenanthrene, pyrene, 3,4-benzpyrene, fluoranthene, triphenylene, 1-phenylnaphthalene, 2-phenylnapthalene, acenaphthene, quinoline, isoquinoline, acridine, phenanthridine, phenazine, 2,3-diphenylquinoline, 2,4-diphenylquinoline and 2,2'-diquinolyl. All of these compounds have a boiling point greater than about 240°C., which corresponds to a vapor pressure of less than about 10 mm. at 100°C., and a melting point less than about 220°C.

Some of the above compounds, for example, the phenylnaphthalenes, the diphenylquinolines and 2,2'-diquinolyl, are also illustrative of those compounds wherein the aromatic rings are coupled directly to each other. Additional representative compounds of this type are diphenyl, 2,2'-dimethyldiphenyl, 3,3'-dimethyldiphenyl, 4,4'-dimethyldiphenyl, 1,1'-dinaphthyl, 2,2'-dinaphthyl, 1,2-diphenylbenzene, 1,3-diphenylbenzene, 1,4-diphenylbenzene, 1,2,3-triphenylbenzene, 1,3,5-triphenylbenzene, 2,2'-dipyridyl, 2,3'-dipyridyl, 2,4'-dipyridyl, 3,3'-dipyridyl, 3,4'dipyridyl, 4,4'-dipyridyl, 2,4-diphenylpyridine, 2,6-diphenylpyridine, 2,3,6-triphenylpyridine, 2,4,5-triphenylpyridine and 2,4,6-triphenylpyridine. These compounds also all boil at a temperature greater than about 240°C. and melt at a temperature less than about 220°C.

Finally, there are those aromatic fluidizer compounds wherein the aromatic rings are coupled to each other through a single oxygen, sulfur, nitrogen or phosphorus atom or through a methylene, dimethylmethylene, ethylene, vinylene or keto group. Compounds of this type are exemplified by diphenyl ether, diphenyl sulfide, diphenyl sulfone, triphenylamine, triphenylphosphine, triphenylphosphine oxide, diphenylmethane, 2,2-diphenylpropane, 1,2-diphenylethane, stilbene and benzophenone. Also included are compounds, such as diphenylene oxide, diphenylene sulfide, fluorene and fluorenone, in which, in addition to the linking atom or group, the rings are directly coupled to each other elsewhere in the molecule. Also to be noted again is acenaphthene, in which the aromatic rings not only are condensed with each other but also are coupled to each other through an ethylene group. Again, all of these compounds are characterized by having boiling points greater than about 240°C. and melting points less than about 220°C.

Another type of fluidizer which can be used in accordance with this invention is that represented by the acetylenic fluidizers disclosed in the aforementioned copending application of Harold Jabloner. These fluidizers are acetylenically substituted (mono- or poly-) aromatic compounds having a melting point below about 185°C. and a boiling point above about 250°C. or vapor pressure at 125°C. of less than about 20 mm. Representative of such acetylenic fluidizers are beta-naphthylacetylene, biphenylacetylene, 4-ethynyl-transazobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, beta-naphthylphenylacetylene, di(alphanaphthyl)acetylene, 1,4-diethylnylbiphenyl, 9,10-diethynylanthracene, 4,4'-diethynylbiphenyl, 9,10-diethynylphenanthrene, 4,4'-diethynyl-transazobenzene, 4,4'-diethynyldiphenyl ether, 2,3,5,6-tetrachloro-1,4-diethynylbenzene, diphenylbutadiyne, di-p-tolyl-diacetylene, dibenzyldiacetylene, 2,2'-dichlorodiphenyl diacetylene, 3,3'-dichlorodiphenyl diacetylene, di(alpha-naphthyl) diacetylene, diethynyldiphenyl butadiyne, etc.

The fluidizer compounds of this invention may be used either individually or in admixture with each other. Other materials may be present in small amounts, if they do not detract from the desirable characteristics of the fluidizing compounds and if the mixture meets the specified physical properties requirements. For example, small amounts of volatile materials can be tolerated in mixtures with higher boiling materials without causing void formation in the compositions during cure. Also, higher melting materials can be tolerated in admixture with other compounds which will depress the melting point of the mixture to the desired temperature. Representative of such mixtures, and particularly advantageous for use as fluidizing agents in accordance with this invention, are the complex mixtures of high boiling aromatic compounds present in high boiling fractions of coal tar and petroleum pitches. The petroleum pitches are mixtures of high boiling aromatic compounds produced during the high temperature cracking of petroleum. The coal tar pitches are mixtures of high boiling aromatic compounds derived from coal tar, the volatile components of the coal tar having been removed by distillation, and phenolic and acidic materials having been substantially removed by caustic extraction.

These pitches are low in acid, phenol, alcohol and non-aromatic unsaturation content as measured by acid, hydroxyl and bromine number determinations. They contain no crystalline organic phase on heating to a temperature above 100°C. Materials of this type are known to contain primarily condensed ring aromatic compounds such as naphthalene, methyl naphthalenes, thionaphthen, quinoline, anthracene, phenanthrene, methyl anthracenes, methyl phenanthrenes, pyrene, chrysene, benzpyrenes, perylene, picene, benzperylenes and coronene, and compounds containing the aromatic rings coupled to each other, such as biphenyl, acenaphthene, carbazole, fluorene, diphenyl ether, fluoranthene, benzfluorenes and benzfluoranthenes.

Just how the fluidizer compound acts on the prepolymers to produce a plastic formable composition is not known. It is believed that it acts as a plasticizer, making it possible to shape the high melting prepolymer, and that, in the case of an acetylenic fluidizer, it also undergoes partial reaction with the prepolymer. In any event, the acetylenic fluidizers, unlike ordinary plasticizers, react with the prepolymer when the plastic formed composition is cured and hence become a part of the final thermoset resin. Some of the aromatic fluidizers also are believed to undergo at least partial reaction with the prepolymer during the curing step.

The amount of fluidizer incorporated in the prepolymer can be varied over a wide range. The amount of aromatic fluidizer generally will be from about 2% to about 200% by weight of the prepolymer, preferably from about 10% to about 100%, and more preferably from about 20% to about 50% by weight based on the prepolymer. The amount of acetylenic fluidizer will generally be from about 2% to about 70% by weight of the prepolymer, and preferably from about 5% to about 40%. When an aromatic fluidizer is used in conjunction with an acetylenic fluidizer, the amount of aromatic fluidizer will generally constitute from about 25 to about 75% of the total amount of fluidizer. The fluidizer can be incorporated in the prepolymer in a variety of ways. One of the simplest methods is to mix the two in a diluent that is a solvent for the two and which is preferably low boiling for ease in removing the diluent after the mixing operation. Suitable diluents for this purpose are methylene chloride, dichloroethane, acetone, methyl ethyl ketone, benzene, toluene, etc. Such diluents can be removed, after adequate mixing has been achieved, by evaporation, distillation, etc. The mixing operation can be carried out at any convenient temperature, generally at room temperature. On the other hand, if the monomer or monomers used for the preparation of the prepolymer have boiling points above about 240°–250°C., the unreacted portion does not need to be removed from the prepolymer and can act as or part of the fluidizer in the thermosetting composition.

The thermal stabilizers of the compositions of this invention also can be incorporated in the prepolymer in a number of ways. For example, the solvent technique just described for incorporation of the fluidizers may be used with those stabilizers which are soluble in the organic solvents used. This method is particularly efficient when a fluidizer, as well as the stabilizer, is used in preparation of the thermosetting composition, since both components can be incorporated at the same time. However, in the case of those stabilizers, such as monobasic ammonium phosphate, which are insoluble in the organic solvents used in preparation of the thermosetting compositions, they can be incorporated by dissolving them in water, adding the resulting solution to a solution of the prepolymer, alone or in combination with a fluidizer, in a solvent such as benzene, and emulsifying the mixture by addition of an emulsifying agent. The formulated composition then can be precipitated by pouring into ethanol, washed with ethanol and dried.

Representative of the thermal stabilizers of this invention are those inorganic oxyacids of boron, phosphorus and sulfur, such as boric acid, phosphoric acid, phosphorous acid, hypophosphorous acid, sulfurous acid and sulfuric acid; alkyl ($C_1$–$C_{12}$) esters of said oxyacids, such as methyl acid phosphate, ethyl acid phosphate, butyl acid phosphate, trioctyl phosphate, tributyl borate, trioctyl borate, ethyl acid borate, butyl acid sulfate and lauryl acid sulfate; aryl ($C_6$–$C_{10}$) esters of said oxyacids, such as triphenyl phosphate, triphenyl phosphite tri(2-tolyl)phosphate, tri(3-tolyl)phosphate, tri(4-tolyl)phosphate, tri(2-tolyl)phosphite, tri(4-tolyl)phosphite and triphenyl borate; arene ($C_6$–$C_{10}$) boronic, phosphinic, phosphonic, sulfinic and sulfonic acids, such as benzeneboronic acid, benzenephosphinic acid, benzenephosphonic acid, benzenesulfinic acid, benzenesulfonic acid, 2-tolueneboronic acid, 3-tolueneboronic acid, 4-toluene-boronic acid, 2-toluenesulfinic acid, 4-toluenesulfinic acid, 2-toluenesulfonic acid, 3-toluenesulfonic acid, 4-toluenesulfonic acid, 1-naphthalenephosphonic acid, 1-naphthalenesulfinic acid, 2-naphthalenesulfinic acid, 1-naphthalenesulfonic acid and 2-naphthalenesulfonic acid; ammonium and amine salts of the acids and partial esters, such as triethanolammonium lauryl acid sulfate; salts and acid salts of the oxyacids of phosphorus and a Group II A metal, such as calcium hypophosphite, calcium orthophosphate, calcium dihydrogen phosphate, barium mono-orthophosphate, barium hypophosphite and stontium hydrogen phosphate; and aryl(-$C_6$–$C_{10}$) phosphines and phosphine oxides, such as triphenylphosphine and triphenylphosphine oxide.

The amines used in forming the salts of the oxyacids and partial esters thereof and of the boronic, phosphinic, phosphonic, sulfinic and sulfonic acids can be any primary, secondary or tertiary aliphatic or aromatic amine wherein the alkyl or hydrooxyalkyl groups in the aliphatic amines contain 1 to 12 carbon atoms and the aryl groups in the aromatic amines contain 6 to 10 carbon atoms. Exemplary amines are methylamine, butylamine, octylamine, dodecylamine, diethylamine, dipropylamine, tri-n-butylamine, tri-n-hexylamine, triethanolamine, aniline, α-naphthylamine, β-naphthylamine, N,N-dimethylaniline, N,N-diethylaniline, diphenylamine and triphenylamine. Cycloaliphatic amines such as cyclohexylamine and aralkyl amines such as N,N-dimethylbenzylamine and N-ethyldibenzylamine also may be used.

There can also be incorporated in the thermosetting composition fillers pigments, antioxidants and other desired additives. Such additives are readily incorporated at the time the prepolymer and the thermal stabilizer are mixed and while the mixing diluent is still present. Exemplary of the materials that can be incorporated are organic and inorganic fibrous materials such as graphite, glass, asbestos, metals, metal oxides, metal carbides, boron, boron carbide, silicon carbide fibers, and particulate reinforcements such as glass beads, metal oxides, metal carbonates, clay, diatomaceous earth, etc. The amount of the filler incorporated in the thermosetting composition can be varied widely, but generally will be from about 1 to about 95 percent by weight of the composition.

After effecting mixing of the components, the compositions so obtained can be divided by any desired means into suitable size pieces for subsequent fabrication operations. Alternatively, the compositions can be ground to fine powders and converted into pellets convenient for utilization in subsequent operations by compacting under pressure at room temperature or at a somewhat elevated temperature. These thermosetting compositions are stable and can be stored at room temperature.

FORMATION OF THE THERMOSET RESIN

The prepolymers modified with a fluidizer will melt on heating and remain sufficiently fluid so that the compositions can be shaped by conventional plastic forming such as extrusion, compression, transfer and injection molding, calendering, forging, etc. Thus, shapes such as sheets, pipes, rods and wire coatings can be made by extrusion. Sheets can in subsequent operations be further modified in form as by embossing or thermoforming. More complex shapes can be made by molding operations. The temperature employed in plastic forming and related operations can be varied widely, the preferred temperature being dependent on the amount of the fluidizer employed, the molecular weight of the prepolymer, the type and amount of any filler or reinforcing agent present, the fabrication method, the pressure employed, ahd the amount of cross-linking desired during the fabrication operation. Temperatures as low as about 40° can be used, or as high as 200°C., but generally will be within the range of from about 90° to about 165°C. As the heating continues above about 90°C., and generally at a pressure of from about 15 to about 15,000 p.s.i., the thermosetting composition resolidifies. In operations such as extrusion or injection molding in which it may be desirable to recycle scrap material, low temperatures are employed to avoid much change in the flow properties of the composition during the fabrication. In other operations such as transfer or compression molding, it may be desirable to fabricate the material at an elevated temperature so that cross-linking or curing of the material occurs during the shaping operation.

After the fabrication operation and heating above 90°C. for a sufficient time to solidify the material, continued application of pressure during subsequent curing is not necessary. The further polymerization or cross-linking reaction to form the insoluble, thermally stable resin does not involve formation of any gaseous or volatile materials and accordingly there is no foaming or void formation. The fabricated article can then be converted to a thermoset resin by additional heating.

The temperature at which the thermosetting composition is heated to effect the further polymerization and cross-linking, which can be referred to as the curing operation, can be varied widely and will depend on such factors as the components of the thermosetting composition, the size and shape of the fabricated article, etc. In general, the conditions for effecting the cure will range from several hours at a temperature of about 100°C. to a few minutes at a temperature of about 300°C. Alternatively, a fabricated article can be used in its only partially cured form, and curing can be effected during use at an elevated temperature.

The reaction that takes place during the curing of a thermosetting composition containing an acetylenic fluidizer involves copolymerization between the prepolymer and the acetylenic fluidizer, which reaction at the same time effects cross-linking of the prepolymer. Hence, in this case, the final thermoset resin can be defined as a copolymer of the prepolymer and the acetylenic fluidizer. In the case of a molding composition containing an aromatic fluidizer, the reaction during curing primarily is one of further polymerization of the prepolymer, with perhaps some accompanying reaction of the prepolymer with the aromatic fluidizer.

The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. They are highly resistant to chemical attack by strong acids and concentrated alkali. As previously stated, these thermoset resins are characterized by having a flexural strength of at least about 4000 p.s.i. and a flexural modulus of at least about 350,000 p.s.i. The resins also are characterized by retaining at least about 35% of said flexural modulus in an inert atmosphere up to a temperature of at least about 300°C., retaining at least about 50% of said flexural strength and modulus and at least about 90% of their weight when a 30 mil thick sheet is aged in air at 260°C. for 350 hours and losing less than about 20% of their weight when heated, in powder form, to 500°C. at a rate of 10°C. per minute in an inert atmosphere. Obviously, these values can be greatly improved by the addition of fillers and other strengthening additives.

By the terms "flexural strength" and "flexural modulus" is meant the strength and modulus as measured according to the procedure described in ASTM No. D-790-70 - Flexural Properties of Plastics.

The new thermosetting compositions of this invention are useful as thermosetting binder resins for glass, carbon, asbestos and boron fibers and in the preparation of moldings to be used in high temperature envvironments, as for example, turbine blades for jet engines, aeroplane wing edges, ablative coatings for space reentry vehicles, bearings, grinding wheels, brake linings and clutch facings. The compositions also are useful as chemically resistant coatings.

The following examples will illustrate the preparation of the prepolymers, the thermosetting compositions and the thermoset resins of this invention. All parts and percentages are by weight unless otherwise indicated.

EXAMPLE 1

A polymerization vessel was charged with a mixture of 630 parts of meta-diethynylbenzene and 70 parts of paradiethynylbenzene dissolved in 3077 parts of anhydrous benzene. The solution was sparged with nitrogen and heated to reflux temperature. There then was added to the refluxing solution in four approximately equal increments a catalyst mixture prepared by mixing 4.7 parts of nickel acetylacetonate and 9.3 parts of triphenylphosphine in 50 parts of anhydrous benzene. After addition of the initial increment, the others were separately added one, two and three hours later. The solution was held at reflux temperature for a total of 6¼ hours, at which time the monomer conversion was 85.5%. The prepolymer then was precipitated by adding the solution to seven times its volume of petroleum ether and the yellow powder, separated by filtration, amounted to 406 parts. The prepolymer contained 11.8% acetylene groups.

EXAMPLE 2

The prepolymer used in this example was prepared by repeating the polymerization reaction of Example 1 several times. Monomer conversion in these reactions was in the range of 85–89%. The reaction mixtures then were added to approximately six times their total volume of heptane, and the precipitated prepolymer was recovered by filtration.

A molding composition was prepared by dissolving the prepolymer and 25% by weight, based on the prepolymer, of 1,4-diphenylbutadiyne in acetone, with thorough mixing, then removing the acetone solvent by evaporation using a rotary evaporator. The composition was dried for 1 hour at 55°C. at 5 mm. pressure. Other molding compositions were prepared in the same way except that in each instance there additionally was added to the acetone solution 1.25% by weight, based on the prepolymer, of one of the stabilizers shown in Table I.

The resulting compositions then were formed into disks 30 mils thick and 1 inch in diameter by compression molding in a semipositive disk mold at 177°C. for 5 minutes under 7000 p.s.i. pressure. The molded disks subsequently were cured at atmospheric pressure for 18 hours at 200°C. These disks were then heated in a forced air oven at 260°C. The time, in hours, at this temperature to give a 10% weight loss of the resin is tabulated in Table I. Also tabulated in Table I are numerical values which are identified as improvement factors. The particular value for each stabilized composition represents the proportional increase in time, in comparison to the unstabilized composition, for the stabilized composition to lose 10% of its weight at 260°C.

TABLE I

| Stabilizer Added | Time to 10% Weight Loss at 260°C | Improvement Factor |
|---|---|---|
| None | 290 | 0 |
| Phosphorous acid | 358 | 1.23 |
| Hypophosphorous acid | 383 | 1.32 |
| Benzenesulfonic acid | 410 | 1.41 |
| Benzenephosphonic acid | 510 | 1.75 |
| Butyl acid phosphate | 438 | 1.51 |
| Triphenyl phosphate | 403 | 1.39 |
| Triphenyl phosphite | 415 | 1.43 |

TABLE I-continued

| Stabilizer Added | Time to 10% Weight Loss at 260°C. | Improvement Factor |
|---|---|---|
| Triphenyl phosphine | 370 | 1.27 |
| Triphenyl phosphine oxide | 445 | 1.53 |

In addition to the information given in Table I, it was determined that the composition containing butyl acid phosphate, cured at 200°C., had a flexural strength of 9850 p.s.i. and a flexural modulus of 900,000 p.s.i. After heating at 260°C. for 200 hours, its flexural strength was 9230 p.s.i. and, after 500 hours it was 8150 p.s.i. At the latter time, the flexural modulus was 1,400,000 p.s.i. Similarly, the cured composition containing triphenyl phosphite had a flexural strength of 9890 p.s.i. and a flexural modulus of 1,000,000 p.s.i. After 200 hours at 260°C., the flexural strength was 8510 p.s.i. and, after 500 hours, the flexural strength was 8240 p.s.i. and the flexural modulus was 1,500,000 p.s.i.

EXAMPLE 3

Following generally the procedure of Example 2, another prepolymer preparation was carried out, and the prepolymer was used in the formulating of molding compositions, as in Example 2. These compositions were compression molded into disks at 149°C. for 5 minutes under 3500 p.s.i. pressure. They were then cured and heated in a forced air oven at 260°C. following the procedure of Example 2. The data obtained, showing the increased resistance to weight loss in comparison to an unstabilized composition, are given in Table II. The amount of stabilizer is expressed as percent by weight based on the prepolymer.

TABLE II

| Stabilizer Added | Amount Based on Prepolymer (%) | Improvement Factor |
|---|---|---|
| None |  | 0 |
| Boric acid | 1.25 | 1.12 |
|  | 6.25 | 1.22 |
| Sulfuric acid | 1.25 | 1.63 |
| Benzeneboronic acid | 6.25 | 1.20 |
| Triphenyl borate | 6.25 | 1.26 |
| Triethanolammonium lauryl sulfate | 6.25 | 1.26 |

EXAMPLE 4

A prepolymer was prepared, following the general procedure described in Example 1, from 225 parts of meta-diethynylbenzene and 25 parts of para-diethynylbenzene dissolved in 2100 parts of benzene. The catalyst was 2.5 parts of nickel acetylacetonate and 5.0 parts of triphenylphosphine. The solution was held at reflux for 4.25 hours, and the prepolymer was precipitated by pouring the reaction mixture into petroleum ether. Monomer conversion was 80%. and the prepolymer has a number average molecular weight of 5500, contained 12.8% acetylene groups and had an aromatic proton to olefinic proton ratio of 13:1.

Three molding compositions were prepared from this prepolymer by blending it with 10% by weight, based on the prepolymer, of 1,4-diphenylbutadiyne and additionally adding 11% by weight, based on the prepolymer, of a stabilizer to two of them. These stabilizers were added by dissolving them in water, adding the aqueous solutions to solutions of the prepolymer and 1,4-diphenylbutadiyne in benzene, adding "Ultrawet" emulsifier, agitating the mixtures to form emulsions, pouring the emulsions into ethanol to precipitate the formulated resins, filtering to recover the resins, washing them with ethanol and drying the recovered formulated materials.

Disks of these materials 30 mils thick and 1 inch in diameter were compression molded at 149°C. for 5 minutes under 10,000 p.s.i. pressure and cured by heating for 5 hours at 250°C. These disks were then heated in a forced air oven at 260°C. The time in hours at this temperature to give a 10% weight loss of the resin, as well as the improvement factor, is tabulated as follows.

| Stabilizer Added | Time to 10% Weight Loss at 260°C. | Improvement Factor |
|---|---|---|
| None | 221 | 0 |
| Monobasic ammonium phosphate | 500 | 2.25 |
| Calcium hypophosphite | 566 | 2.55 |

EXAMPLE 5

Using the technique described in Example 1, a prepolymer was prepared from para-diethynylbenzene. Monomer conversion was 74%. Molding compositions were prepared from this prepolymer by blending it with the stabilizers of Example 4, using the procedure of that example. No fluidizer was used. Molded disks were prepared and evaluated as in Example 4.

| Stabilizer Added | Amount Base on Prepolymer (%) | Time to 10% Weight Loss at 260°C. | Improvement Factor |
|---|---|---|---|
| None |  | 220 | 0 |
| Monobasic ammonium phosphate | 4.5 | 367 | 1.67 |
| Calcium hypophosphite | 10 | 422 | 1.92 |

What I claimed and desire to protect by Letters Patent is:

1. A thermosetting composition comprising a blend of (1) a prepolymer of at least one polyacetylenically substituted aromatic compound, said prepolymer having a number average molecular weight from about 900 to about 12,000, a ratio of aromatic protons olefinic protons greater than about 2.4 and containiing from about 5 to about 20% acetylenic groups by weight of the prepolymer with (2) from about 0.1 to about 20%, by weight of the prepolymer, of at least one thermal stabilizer selected from the group consisting of the inorganic oxyacids of phosphorous, the ammonium and amine salts of said oxyacids, the alkyl and aryl esters of said oxyacids, and the ammonium and amine salts of said esters which are partial esters, the alkyl group in said alkyl esters containing from 1 to 12 carbon atoms and the aryl group in said aryl esters containing from 6 to 10 carbon atoms.

2. The thermosetting composition of claim 1 wherein the prepolymer comprises a polymer of a diethynylbenzene.

3. The thermosetting composition of claim 2 wherein the polymer of a diethynylbenzene is a copolymer of a diethynylbenzene and diphenylbutadiyne.

4. The thermosetting composition of claim 2 wherein the polymer of a diethynylbenzene is a copolymer of a diethynylbenzene and phenylacetylene.

5. The thermosetting composition of claim 2 wherein the thermal stabilizer is an alkyl ester of the oxyacids of phosphorus.

6. The thermosetting composition of claim 5 wherein the thermal stabilizer is butyl acid phosphate.

7. The thermosetting composition of claim 1 wherein the thermal stabilizer is an aryl ester of the oxyacids of phosphorus.

8. The thermosetting composition of claim 7 wherein the thermal stabilizer is triphenyl phosphite.

9. The thermosetting composition of claim 7 wherein the thermal stabilizer is triphenyl phosphate.

10. The thermosetting composition of claim 2 wherein the thermal stabilizer in an ammonium salt of the oxyacids of phosphorus.

11. The thermosetting composition of claim 10 wherein the thermal stabilizer is monobasic ammonium phosphate.

12. A thermoset resin obtained by heat curing the thermosetting composition of claim 1.

13. The process of preparing a thermoset resin essentially free of aliphatic unsaturation which comprises (1) preparing a prepolymer by polymerizing at least one polyacetylenically substituted aromatic compound by heating said compound with an aromatization catalyst in an inert organic diluent to a temperature of from about 55° to about 250°C. until from about 30% to about 90% of said compound has been converted to polymer, (2) separating the prepolymer from the polymerization reaction mixture, (3) fabricating a blend of said prepolymer with from about 0.1 to about 20%, by weight of the prepolymer, of at least one thermal stabilizer selected from the group consisting of the inorganic oxyacids of phosphorus, the ammonium and amine salts of said oxyacids, the alkyl and aryl esters of said oxyacids, and the ammonium and amine salts of said esters which are partial esters, the alkyl group in said alkyl esters containing from 1 to 12 carbon atoms and the aryl group in said aryl esters containing from 6 to 10 carbon atoms, and (4) heating the fabricated blend to a temperature of from about 100° to about 300°C.

* * * * *

UNITED STATES PATENT AND TRADEMARK OFFICE
CERTIFICATE OF CORRECTION

PATENT NO. : 3,926,907
DATED : December 16, 1975
INVENTOR(S) : Edward Jacob Engle III It is certified that error appears in the above-identified patent and that said Letters Patent are hereby corrected as shown below:

Col. 7, lines 53 and 54, " 1,4-diethylnylbiphenyl, " should read -- 1,4-diethynylnaphthalene, --.

In the Claims, Col. 14, Claim 1, line 56, " protons olefinic " should read -- protons to olefinic --.

In the Claims, Col. 15, Claim 7, line 17, " claim 1 " should read -- claim 2 --.

Signed and Sealed this thirtieth Day of March 1976

[SEAL]

Attest:

RUTH C. MASON
Attesting Officer

C. MARSHALL DANN
Commissioner of Patents and Trademarks